US012656989B1

(12) United States Patent
Chen et al.

(10) Patent No.: US 12,656,989 B1
(45) Date of Patent: Jun. 16, 2026

(54) DISPLAY DEVICE AND DISPLAY SYSTEM EMPLOYING DEVICE

(71) Applicants: HON HAI PRECISION INDUSTRY CO., LTD., New Taipei (TW); HONGFUJIN PRECISION INDUSTRY (WUHAN) CO., LTD., Wuhan (CN)

(72) Inventors: Chia-Chin Chen, New Taipei (TW); Jimmy Chen, New Taipei (TW)

(73) Assignees: HON HAI PRECISION INDUSTRY CO., LTD., New Taipei (TW); HONGFUJIN PRECISION INDUSTRY (WUHAN) CO., LTD., Wuhan (CN)

( * ) Notice: Subject to any disclaimer, the term of this patent is extended or adjusted under 35 U.S.C. 154(b) by 0 days.

(21) Appl. No.: 19/181,567

(22) Filed: Apr. 17, 2025

(30) Foreign Application Priority Data

Dec. 31, 2024   (CN) .......................... 202411995813.9

(51) Int. Cl.
   *G06F 3/14*       (2006.01)
   *G06F 1/16*       (2006.01)
   *G06F 3/147*      (2006.01)

(52) U.S. Cl.
   CPC .......... *G06F 3/1423* (2013.01); *G06F 1/1647* (2013.01); *G06F 3/147* (2013.01)

(58) Field of Classification Search
   CPC ....... G09G 2354/00; G09G 2300/0426; G09G 2300/0842; G09G 2300/0452; G09G 2300/0819; G09G 2300/026; G09G 2300/043; G09G 3/3233; G09G 3/346;

G09G 5/14; G09G 2340/0407; G09G 2340/045; G09G 2340/0492; G09G 2340/0442; G09G 2356/00; G09G 2370/042; G09G 2360/04; G09G 2380/08; G09G 2320/0209; G09G 2330/021; G09G 2358/00; G06F 3/1423; G06F 3/1445; G06F 3/0482; G06F 3/011; G06F 3/04842; G06F 3/017; G06F 3/1454; G06F 3/04883; G06F 3/0481; G06F 3/13; G06F 3/0488; G06F 3/04845; G06F 3/04886; G06F 3/04817; G06F 3/0484; G06F 3/14; G06F 3/04847;
(Continued)

(56) References Cited

U.S. PATENT DOCUMENTS

2008/0088634 A1* 4/2008 Thompson ............... G09G 5/00
                                                345/520
2018/0039470 A1* 2/2018 Tokita ................... G06F 3/1423
(Continued)

*Primary Examiner* — Dong Hui Liang
(74) *Attorney, Agent, or Firm* — ScienBiziP, P.C.

(57) ABSTRACT

A display device for achieving diversified display includes a first interface, a second interface, a first display module, a second display module and a signal transmission module. The first display module and the second display module display images according to first display signals received by the first interface, or display images according to second display signals received by the second interface. The signal transmission module is coupled to the first interface, the second interface, the first display module, and the second display module. The signal transmission module can transmit the first display signals and/or the second display signals to the first display module and/or the second display module. A display system is also provided.

18 Claims, 5 Drawing Sheets

(58) Field of Classification Search
  CPC ... G06F 8/71; G06F 9/54; G06F 9/542; G06F
                                            21/6218
  See application file for complete search history.

(56)                References Cited

U.S. PATENT DOCUMENTS

2018/0113666 A1*   4/2018  Knepper  ............... G06F 1/1647
2019/0129596 A1*   5/2019  Ligameri  .............. G06F 1/1647

* cited by examiner

DISPLAY DEVICE AND DISPLAY SYSTEM EMPLOYING DEVICE

TECHNICAL FIELD

The subject matter herein generally relates to display technologies.

BACKGROUND

Display technology becomes an indispensable part of life and work, especially in a background of a increasing demand for multi-tasking. At present, most of the display devices only can connect with a display signal source, the display device can perform extended display or duplicate display of images from the display signal source. A display mode of the display device is relatively simple, and the display device is difficult to meet a need of a user for multiple display modes in different usage scenarios.

Therefore, there is a room for improving the display device.

BRIEF DESCRIPTION OF THE DRAWINGS

Implementations of the present disclosure will now be described, by way of embodiments, with reference to the attached figures.

DETAILED DESCRIPTION

Figure 1:
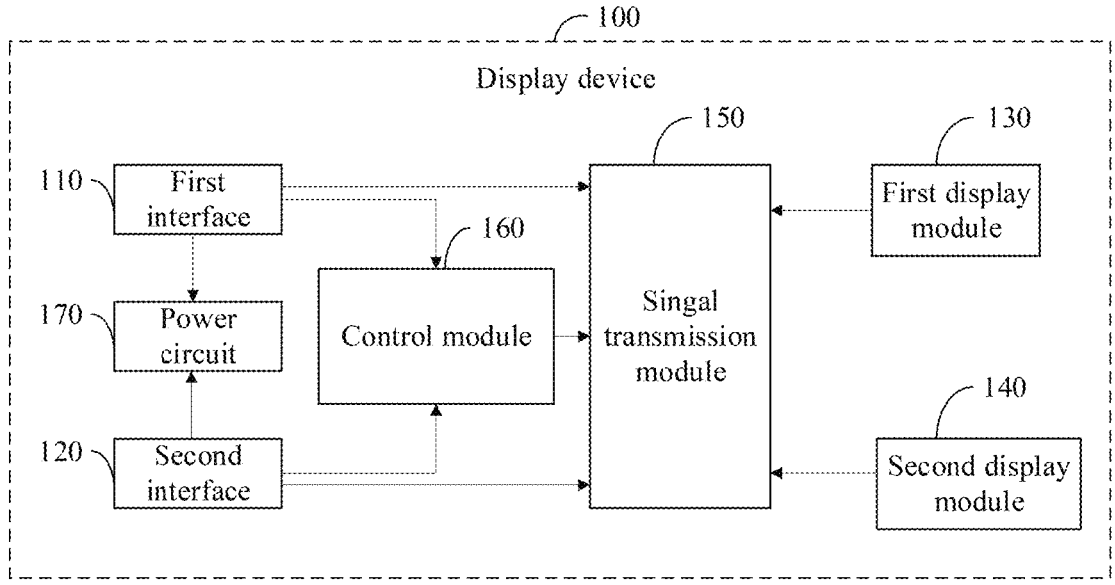
FIG. 1 is a block diagram illustrating a display device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasable connected. The term "comprising," when utilized, means "including, but not necessarily limited to"; it specifically indicates open-ended inclusion or membership in the so-described combination, group, series, and the like.

FIG. 1 illustrates an embodiment of a display device 100. The display device 100 may include a first interface 110, a second interface 120, a first display module 130, a second display module 140, and a signal transmission module 150. The first interface 110 is configured to receive first display signals. The second interface 120 is configured to receive second display signals. The first display module 130 is configured to display first images according to the first display signals, or display second images according to the second display signals. The second display module 140 is configured to display the first images according to the first display signals, or display the second images according to the second display signals.

The signal transmission module 150 is coupled to the first interface 110, the second interface 120, the first display module 130, and the second display module 140. The signal transmission module may receive first display control signals, second display control signals, third display control signals, or fourth display control signals.

When the signal transmission module 150 receives the first display control signals, the signal transmission module 150 is configured to transmit the first display signals to the first display module 130 or the second display module 140 according to the first display control signals. When the signal transmission module 150 receives the second display control signals, the signal transmission module 150 is configured to transmit the second display signals to the first display module 130 or the second display module 140 according to the second display control signals. When the signal transmission module 150 receives the third display control signals, the signal transmission module 150 is configured to transmit the first display signals to the first display module 130 and the second display module 140 according to the third display control signals. When the signal transmission module 150 receives the fourth display control signals, the signal transmission module 150 is configured to transmit the second display signals to the first display module 130 and the second display module 140 according to the fourth display control signals.

In one embodiment, the first interface 110 can couple with a first input device 200, and the second interface 120 can couple with a second input device 300. The first input device 200 and the second input device 300 may be notebook computers, desktop computer hosts, mobile phones, or other devices that can be used as signal sources. A user can select a window to be displayed and a display module to be displayed on the first input device 200 and/or the second input device 300, and display control signals can be generated in response to selecting operation of the user. The display control signals are configured to control the signal transmission module 150 to transmit the first display signals and/or the second display signals to corresponding display modules.

In one embodiment, the first interface 110 and the second interface 120 may include type-C interfaces, universal serial bus (USB) interfaces, or lighting interfaces, etc.

In one embodiment, the display signals (the first display signals and/or the second display signals) can include image information and supply voltage. The image information can be configured to control the display module (the first display module 130 and/or the second display module 140) to display images, and the supply voltage can be configured to supply power to the display module. Thus, no additional power wires is needed to supply power to the display module.

In one embodiment, the display device 100 may further include a control module 160 coupled to the first interface 110 and the second interface 120. The control module 160 is configured to receive first display instructions outputted by the first input device 200 and/or second display instructions outputted by the second input device 300. The control module 160 is further configured to output corresponding display control signals according to the first display instructions and/or the second display instructions. For example, the control module 160 can output the first display control signals, the second display control signals, the third display control signals, and the fourth display control signals according to the first display instructions and/or the second display instructions.

In one embodiment, the control module 160 may include a microprocessor, a micro-controller unit (MCU), a field-effect programmable logic array (FPGA), a digital signal processor (DSP), or a system-on-chip (SoC), etc.

In one embodiment, the control module 160 can be integrated into the first display module 130 or the second display module 140. The control module 160 can also be set separately from the display module.

For example, when the first interface 110 is coupled to the first input device 200 and a user needs to display a product document on the first display module 130, the user can select a window of the product document and the first display module 130 on the first input device 200. The first input device 200 outputs corresponding first display signals and corresponding first display instructions, the corresponding first display instructions are configured to control the signal transmission module 150 to transmit the corresponding first display signals to the first display module 130 for display. The control module 160 can control the signal transmission module 150 to transmit the corresponding first display signals including the window of the product document to the first display module 130 for display according to the corresponding first display instructions.

For example, the first input device 200 may output the first display signals to the signal transmission module 150, and output the first display instructions to the control module 160, the control module 160 controls the signal transmission module 150 to transmit the first display signals to the first display module 130 for display according to the first display instructions.

If a user needs to display a product document simultaneously on the first display module 130 and the second display module 140. The user can select a window of the product document, the first display module 130, and the second display module 140 on the first input device 200, and further select a display mode of the first display module 130 and the second display module 140 as a duplicate display mode. The first input device 200 outputs corresponding first display signals and corresponding first display instructions, the corresponding first display instructions are configured to control the signal transmission module 150 to transmit the corresponding first display signals to the first display module 130 and the second display module 140 for duplicate display. The control module 160 can control the signal transmission module 150 to transmit the corresponding first display signals including the window of the product document to the first display module 130 and the second display module 140 according to the corresponding first display instructions. Thus, the first display module 130 and the second display module 140 can simultaneously display the window of the product document.

If a user needs to display a product document on the second display module 140, the user can select a window of the product document and the second display module 140 on the first input device 200. The first input device 200 outputs corresponding first display signals and corresponding first display instructions, the corresponding first display instructions are configured to control the signal transmission module 150 to transmit the corresponding first display signals to the second display module 140 for display. The control module 160 can control the signal transmission module 150 to transmit the corresponding first display signals including the window of the product document to the second display module 140 for display according to the corresponding first display instructions.

If a user needs the first display module 130 and the second display module 140 operate as one display module for displaying a product document. The user can select a window of the product document, the first display module 130, and the second display module 140 on the first input device 200, and further select a display mode of the first display module 130 and the second display module 140 as an extended display mode. The first input device 200 outputs corresponding first display signals and corresponding first display instructions, the corresponding first display instructions are configured to control the signal transmission module 150 to transmit the corresponding first display signals to the first display module 130 and the second display module 140 for extended display. The control module 160 can control the signal transmission module 150 to transmit the corresponding first display signals including the window of the product document to the first display module 130 and the second display module 140 according to the corresponding first display instructions. The first display module 130 and the second display module 140 can operate as one display module to display the window of the product document, achieving a display of the product document in a larger display area.

In one embodiment, in the extended display mode, the control module 160 can distribute the window of the product document corresponding to the first display module 130 and the second display module 140 according to a preset rule, and control the signal transmission module 150 to transmit distributed window content of the product document to the first display module 130 and the second display module 140.

Similarly, when the second interface 120 is coupled to the second input device 300, a user can select a window to be displayed and one or more display modules to be displayed on the second input device 300, and generate corresponding second display instructions and second display signals, to control the first display module 130 and/or the second display module 140 for window display. A display principle of this embodiment can refer to a display principle of the first interface 110 coupled to the first input device 200, and details are not be repeated here.

When the first interface 110 is coupled to the first input device 200, and the second interface 120 is coupled to the second input device 300, a user can select a window to be displayed and one or more display module to be displayed on the first input device 200 and the second input device 300 respectively.

For example, if a user needs to display a product document stored in the first input device 200 on the first display module 130, and display a product image stored in the second input device 300 on the second display module 140. A window of the product document and the first display module 130 can be selected on the first input device 200, the first input device 200 outputs corresponding first display instructions and corresponding first display signals. The control module 160 can control the signal transmission module 150 to transmit the corresponding first display signals including the window of the product document to the first display module 130 for display according to the corresponding first display instructions. In addition, a window of the product image and the second display module 140 can be selected on the second input device 300, the second input device 300 outputs corresponding second display instructions and corresponding second display signals. The control module 160 can control the signal transmission module 150 to transmit the corresponding second display signal including the window of the product image to the second display module 140 for display according to the corresponding second display instructions.

If a user needs to display a product image stored in the second input device 300 on the first display module 130, and display a product document stored in the first input device 200 on the second display module 140. A window of the product document and the second display module 140 can be selected on the first input device 200, the first input device 200 outputs corresponding first display instructions and corresponding first display signals. The control module 160 can control the signal transmission module 150 to transmit the corresponding first display signals including the window of the product image to the second display module 140 for display according to the corresponding first display instructions. In addition, a window of the product image and the first display module 130 can be selected on the second input device 300, and the second input device 300 outputs corresponding second display instructions and corresponding second display signals. The control module 160 can control the signal transmission module 150 to transmit the corresponding second display signals including the window of the product document to the first display module 130 for display according to the corresponding second display instructions.

In this way, the user can flexibly select a display mode according to an actual requirement, and the display signals can be transmitted to corresponding display module through the signal transmission module 150. The user can freely switch between multiple display modes according to the actual requirement, improving utilization efficiency and convenience.

The embodiment can receive display signals from different signal input devices through the first interface 110 and the second interface 120 respectively, and transmit received display signals to corresponding display modules through the signal transmission module 150. Thus, a user can select one or more appropriate display modules for display according to actual requirements, facilitating information display. In addition, the display device 100 can receive display signals from two input devices at the same time, and simultaneously display the display signals of the two input devices. Thus, the user can easily handle multi-task without frequent switching of connected input devices.

Figure 2:
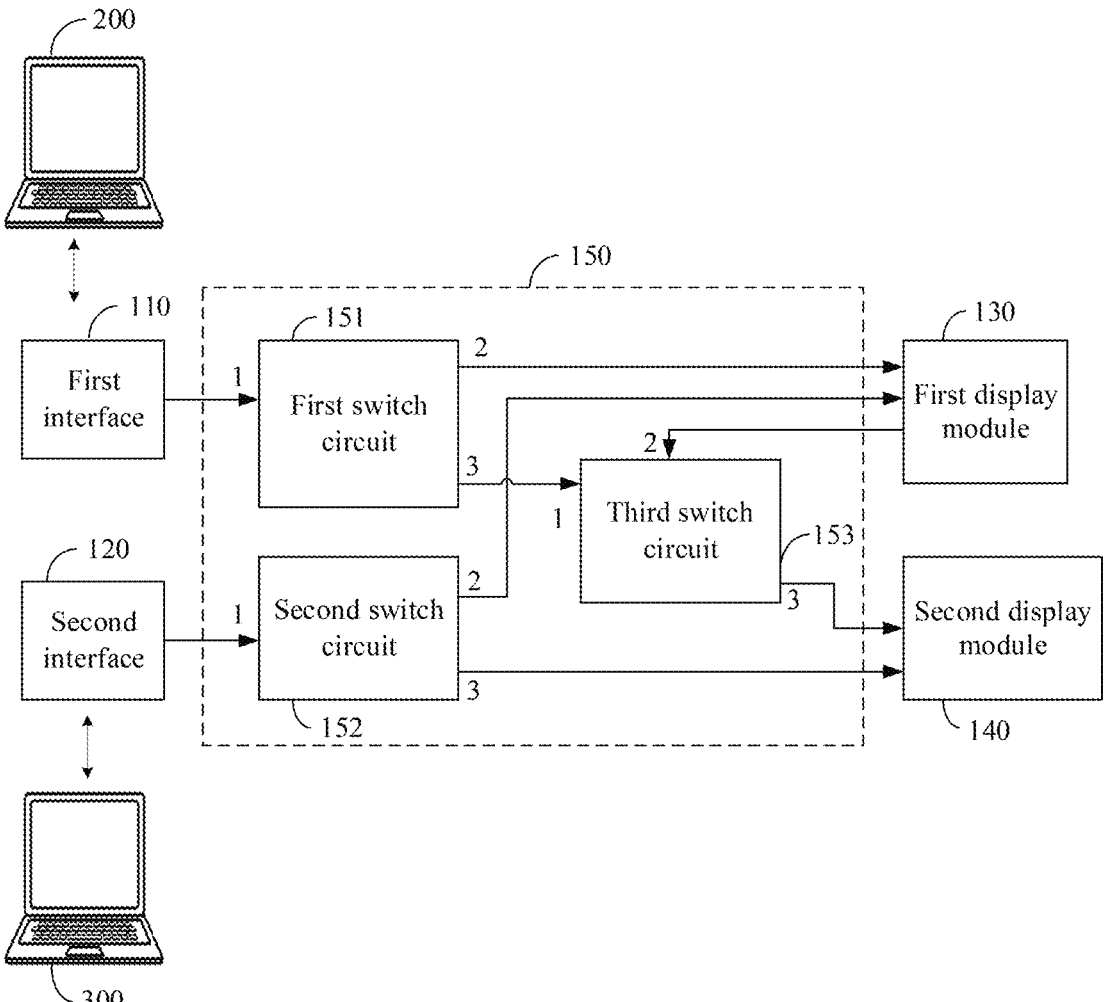
FIG. 2 is a block diagram illustrating a signal transmission module according to an embodiment of the present disclosure.

Referring to FIG. 2, in one embodiment, the signal transmission module 150 may include a first switch circuit

151, a second switch circuit 152, and a third switch circuit 153. A first end of the first switch circuit 151 is coupled to the first interface 110, a second end of the first switch circuit 151 is coupled to the first display module 130, a third end of the first switch circuit 151 is coupled to a first end of the third switch circuit 153, a fourth end of the first switch circuit 151 is configured to receive first control signals. The first control signals are configured to control the first end of the first switch circuit 151 to couple to the second end of the first switch circuit 151, or control the first end of the first switch circuit 151 to couple to the third end of the first switch circuit 151.

A first end of the second switch circuit 152 is coupled to the second interface 120, a second end of the second switch circuit 152 is coupled to the first display module 130, a third end of the second switch circuit 152 is coupled to the second display module 140, a fourth end of the second switch circuit 152 is configured to receive second control signals. The second control signals are configured to control the first end of the second switch circuit 152 to couple to the second end of the second switch circuit 152, or control the first end of the second switch circuit 152 to couple to the third end of the second switch circuit 152. A second end of the third switch circuit 153 is coupled to the first display module 130, a third end of the third switch circuit 153 is coupled to the second display module 140, a fourth end of the third switch circuit 153 is configured to receive third control signals. The third control signals are configured to control the first end of the third switch circuit 153 to couple to the third end of the third switch circuit 153, or control the second end of the third switch circuit 153 to couple to the third end of the third switch circuit 153.

In one embodiment, the first control signals, the second control signals, and the third control signals can be generated based on corresponding display instructions.

In one embodiment, the first display module 130 is further configured to transmit the first display signals or the second display signals to the third switch circuit 153.

In one embodiment, when the second end of the third switch circuit 153 and the third end of the third switch circuit 153 are in conduction, the third switch circuit 153 is further configured to transmit the first display signals or the second display signals to the second display module 140.

In one embodiment, the control module 160 is further configured to control the first display module 130 and the second display module 140 to operate as one display module for displaying the first images according to the first display instructions and/or the second display instructions.

In one embodiment, the control module 160 is further configured to control the first display module 130 and the second display module 140 to operate as one display module for displaying the second images according to the first display instructions and/or the second display instructions.

In one embodiment, the first switch circuit 151, the second switch circuit 152, and the third switch circuit 153 may include switch chips, such as switch components manufactured by Texas Instruments: CB3T series switch components, CB3Q series switch components, CBT-C series switch components, etc.

In one embodiment, when the first interface 110 is coupled to the first input device 200 and a user needs to display a product document on the first display module 130, the user can select a window of the product document and the first display module 130 on the first input device 200. The first input device 200 outputs corresponding first display signals and corresponding first display instructions. The control module 160 can control the first end of the first switch circuit 151 to couple to the second end of the first switch circuit 151 according to the corresponding first display instructions. Thus, the corresponding first display signals including the window of the product document can be transmitted to the first display module 130.

If a user needs to display a product document on the second display module 140, the user can select a window of the product document and the second display module 140 on the first input device 200. The first input device 200 outputs corresponding first display signals and corresponding first display instructions. The control module 160 can control the first end of the first switch circuit 151 to couple to the third end of the first switch circuit 151 and the first end of the third switch circuit 153 to couple to the third end of the third switch circuit 153 according to the corresponding first display instructions. The corresponding first display signal can be transmitted to the second display module 140 through a transmission path formed by the first end of the first switch circuit 151, the third end of the first switch circuit 151, the first end of the third switch circuit 153, and the third end of the third switch circuit 153. The corresponding first display signal can trigger the second display module 140 to display images.

If a user needs to display a product document simultaneously on the first display module 130 and the second display module 140. The user can select a window of the product document, the first display module 130, and the second display module 140 on the first input device 200, and further select a display mode of the first display module 130 and the second display module 140 as a duplicate display mode. The first input device 200 outputs corresponding first display signals and corresponding first display instructions. The control module 160 can control the first end of the first switch circuit 151 to couple to the second end of the first switch circuit 151 and the second end of the third switch circuit 153 to couple to the third end of the third switch circuit 153 according to the corresponding first display instructions. The corresponding first display signals can be transmitted to the first display module 130 through the first end of the first switch circuit 151 and the second end of the first switch circuit 151, and then transmitted to the second display module 140 through the second end of the third switch circuit 153 and the third end of the third switch circuit 153. In this way, the corresponding first display signals can be transmitted to the first display module 130 and the second display module 140 for display.

If a user needs the first display module 130 and the second display module 140 to operate as one display module for displaying a product document. The user can select a window of the product document, the first display module 130, and the second display module 140 on the first input device 200, and further select a display mode of the first display module 130 and the second display module 140 as an extended display mode. The first input device 200 outputs corresponding first display signals and corresponding first display instructions. The control module 160 can control the first end of the first switch circuit 151 to couple to the second end of the first switch circuit 151 and the second end of the third switch circuit 153 to couple to the third end of the third switch circuit 153 according to the corresponding first display instructions. The corresponding first display signals can be transmitted to the first display module 130 through the first end of the first switch circuit 151 and the second end of the first switch circuit 151, and then transmitted to the second display module 140 through the second end of the third switch circuit 153 and the third end of the third switch circuit 153. In this way, the corresponding first display signals can be transmitted to the first display module 130 and the second display module 140 for display. The first display signals transmitted to the first display module 130 and the second display module 140 can be the same, or different first display signals can be transmitted to the first display module 130 and the second display module 140 according to a display requirement of a window displayed in each display module.

In one embodiment, when the second interface 120 is coupled to the second input device 300 and a user needs to display a product document on the second display module 140, the user can select a window of the product document and the second display module 140 on the second input device 300. The second input device 300 outputs corresponding second display signals and corresponding second display instructions. The control module 160 can control the first end of the second switch circuit 152 to couple to the third end of the second switch circuit 152 according to the corresponding second display instructions. Thus, the corresponding second display signals including the window of the product document can be transmitted to the second display module 140.

If a user needs to display a product document on the first display module 130, the user can select a window of the product document and the first display module 130 on the second input device 300. The second input device 200 outputs corresponding second display signals and corresponding second display instructions. The control module 160 can control the first end of the second switch circuit 152 to couple to the second end of the second switch circuit 152 according to the corresponding second display instructions. Thus, the corresponding second display signals including the window of the product document can be transmitted to the first display module 130.

If a user needs to display a product document simultaneously on the first display module 130 and the second display module 140. The user can select a window of the product document, the first display module 130, and the second display module 140 on the second input device 300, and further select a display mode of the first display module 130 and the second display module 140 as a duplicate display mode. The second input device 300 outputs corresponding second display signals and corresponding second display instructions. The control module 160 can control the first end of the second switch circuit 152 to couple to the second end of the second switch circuit 152 and the second end of the third switch circuit 153 to couple to the third end of the third switch circuit 153 according to the corresponding second display instructions. The corresponding second display signals can be transmitted to the first display module 130 through the first end of the second switch circuit 152 and the second end of the second switch circuit 152, and then transmitted to the second display module 140 through the second end of the third switch circuit 153 and the third end of the third switch circuit 153. In this way, the corresponding second display signals can be transmitted to the first display module 130 and the second display module 140 for display.

If a user needs the first display module 130 and the second display module 140 to operate as one display module for displaying a product document. The user can select a window of the product document, the first display module 130, and the second display module 140 on the second input device 300, and further select a display mode of the first display module 130 and the second display module 140 as an extended display mode. The second input device 300 outputs corresponding second display signals and corresponding second display instructions. The control module 160 can control the first end of the second switch circuit 152 to couple to the second end of the second switch circuit 152 and the second end of the third switch circuit 153 to couple to the third end of the third switch circuit 153 according to the corresponding second display instructions. Thus, the corresponding second display signals can be transmitted to the first display module 130 and the second display module 140 for display. The corresponding second display signals transmitted to the first display module 130 and the second display module 140 can be the same, or different second display signals can be transmitted to the first display module 130 and the second display module 140 according to a display requirement of a window displayed in each display module.

In one embodiment, when the first interface 110 is coupled to the first input device 200, and the second interface 120 is coupled to the second input device 300, a user can select a window to be displayed and one or more display module to be displayed on the first input device 200 and the second input device 300 respectively.

For example, if a user needs to display a product document stored in the first input device 200 on the first display module 130, and display a product image stored in the second input device 300 on the second display module 140. A window of the product document and the first display module 130 can be selected on the first input device 200, the first input device 200 outputs corresponding first display instructions and corresponding first display signals. The control module 160 can control the first end of the first switch circuit 151 to couple to the second end of the first switch circuit 151 according to the corresponding first display instructions, then the corresponding first display signals can be transmitted to the first display module 130 for display. In addition, a window of the product image and the second display module 140 can be selected on the second input device 300, the second input device 300 outputs corresponding second display instructions and corresponding second display signals. The control module 160 can control the first end of the second switch circuit 152 to couple to the third end of the second switch circuit 152 according to the corresponding second display instructions, then the corresponding second display signals can be transmitted to the second display module 140 for display.

If a user needs to display a product image stored in the second input device 300 on the first display module 130, and display a product document stored in the first input device 200 on the second display module 140. A window of the product document and the second display module 140 can be selected on the first input device 200, the first input device 200 outputs corresponding first display instructions and corresponding first display signals. The control module 160 can control the first end of the first switch circuit 151 to couple to the third end of the first switch circuit 151 and the first end of the third switch circuit 153 to couple to the third end of the third switch circuit 153 according to the corresponding first display instructions, then the corresponding first display signals can be transmitted to the second display module 140 for display. In addition, a window of the product image and the first display module 130 can be selected on the second input device 300, and the second input device 300 outputs corresponding second display instructions and corresponding second display signals. The control module 160 can control the first end of the second switch circuit 152 to couple to the second end of the second switch circuit 152 according to the corresponding second display instructions, then the corresponding second display signals can be transmitted to the first display module 130 for display.

Figure 3:
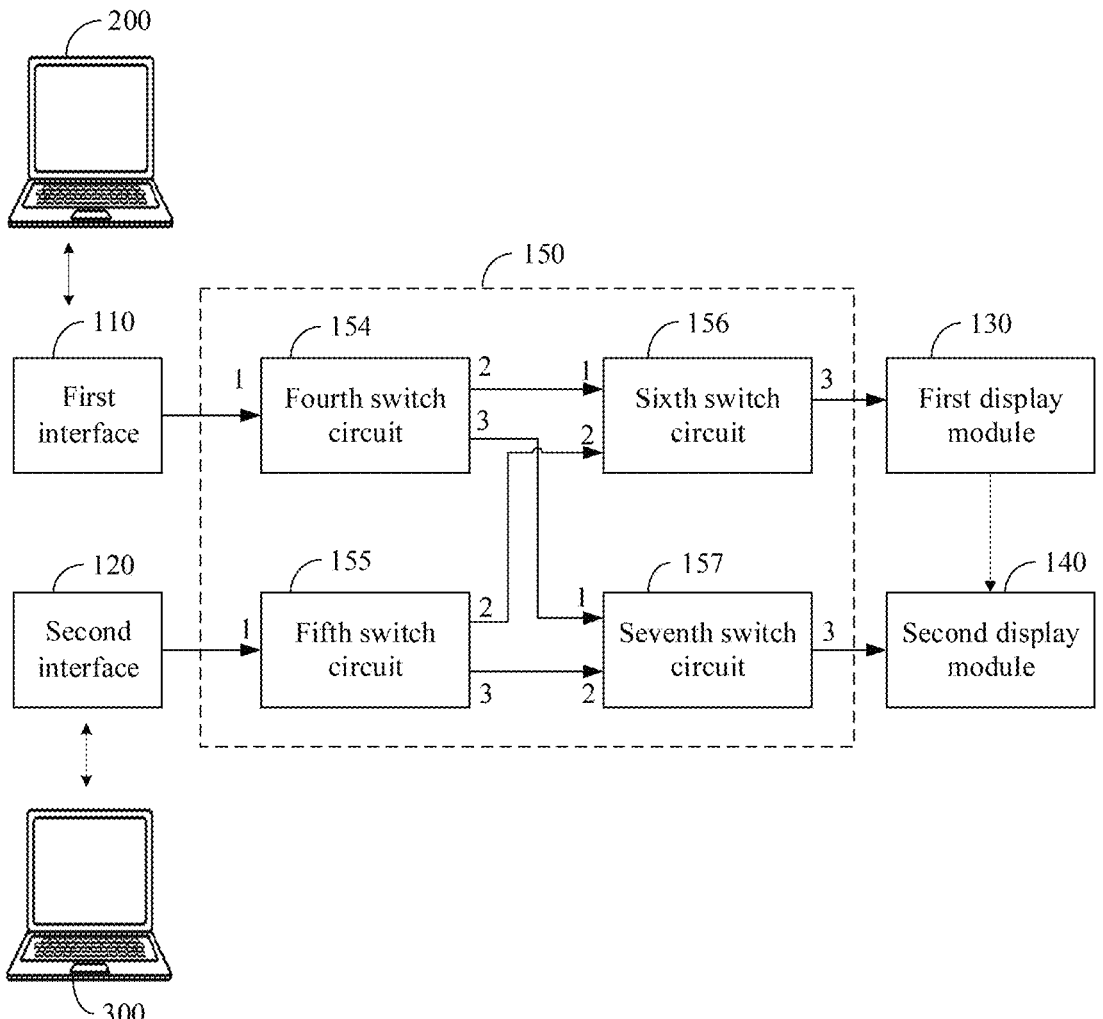
FIG. 3 is a block diagram illustrating a signal transmission module according to another embodiment of the present disclosure.
Figure 4:
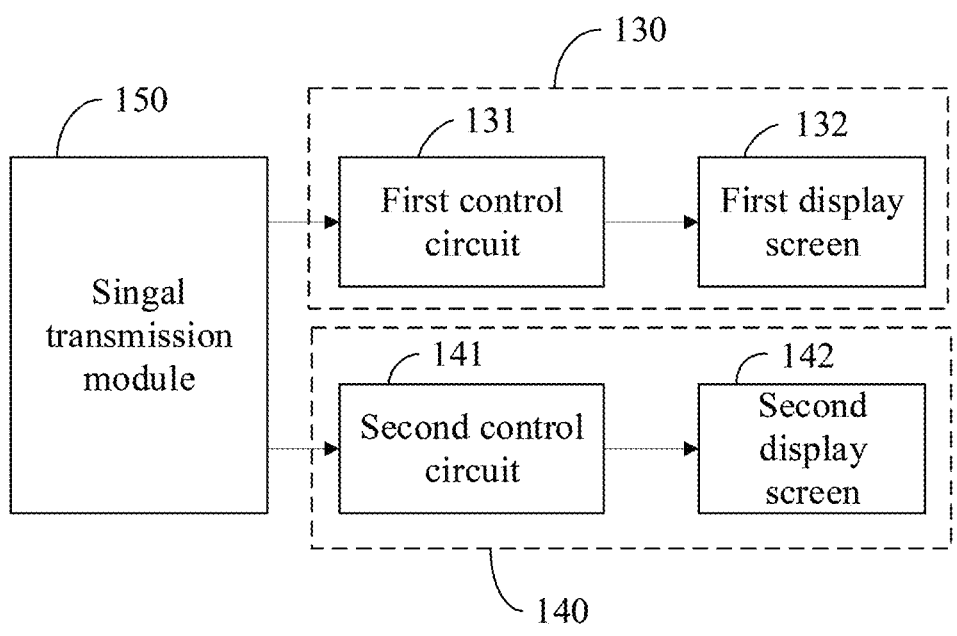
FIG. 4 is a block diagram illustrating a first display module and a second display module according to an embodiment of the present disclosure.

Referring to FIG. 3, the signal transmission module 150 may include a fourth switch circuit 154, a fifth switch circuit 155, a sixth switch circuit 156, and a seventh switch circuit 157. A first end of the fourth switch circuit 154 is coupled to the first interface 110, a second end of the fourth switch circuit 154 is coupled to a first end of the sixth switch circuit 156, a third end of the fourth switch circuit 154 is coupled to a first end of the seventh switch circuit 157, a fourth end of the fourth switch circuit 154 is configured to receive fourth control signals. The fourth control signals are configured to control the first end of the fourth switch circuit 154 to couple to the second end of the fourth switch circuit 154, or control the first end of the fourth switch circuit 154 to couple to the third end of the fourth switch circuit 154.

A first end of the fifth switch circuit 155 is coupled to the second interface 120, a second end of the fifth switch circuit 155 is coupled to a second end of the sixth switch circuit 156, a third end of the fifth switch circuit 155 is coupled to a second end of the seventh switch circuit 157, a fourth end of the fifth switch circuit 155 is configured to receive fifth control signals. The fifth control signals are configured to control the first end of the fifth switch circuit 155 to couple to the second end of the fifth switch circuit 155, or control the first end of the fourth switch circuit 154 to couple to the third end of the fourth switch circuit 154.

A third end of the sixth switch circuit 156 is coupled to the first display module 130, a fourth end of the sixth switch circuit 156 is configured to receive sixth control signals. The sixth control signals are configured to control the first end of the sixth switch circuit 156 to couple to the third end of the sixth switch circuit 156, or control the second end of the sixth switch circuit 156 to couple to the third end of the sixth switch circuit 156. A third end of the seventh switch circuit 157 is coupled to the second display module 140, a fourth end of the seventh switch circuit 157 is configured to receive seventh control signals. The seventh control signals are configured to control the first end of the seventh switch circuit 157 to couple to the third end of the seventh switch circuit 157, or control the second end of the seventh switch circuit 157 to couple to the third end of the seventh switch circuit 157.

In one embodiment, the fourth control signals, the fifth control signals, the sixth control signals, and the seventh control signals can be generated based on corresponding display instructions.

In one embodiment, when the first interface 110 is coupled to the first input device 200 and a user needs to display a product document on the first display module 130, the user can select a window of the product document and the first display module 130 on the first input device 200. The first input device 200 outputs corresponding first display signals and corresponding first display instructions. The control module 160 can control the first end of the fourth switch circuit 154 to couple to the second end of the fourth switch circuit 154 and the first end of the sixth switch circuit 156 to couple to the third end of the sixth switch circuit 156 according to the corresponding first display instructions. Thus, the corresponding first display signals can be transmitted to the first display module 130 for display through a transmission path formed by the first end of the fourth switch circuit 154, the third end of the fourth switch circuit 154, the first end of the sixth switch circuit 156, and the third end of the sixth switching circuit 156.

If a user needs to display a product document on the second display module 140, the user can select a window of the product document and the second display module 140 on the first input device 200. The first input device 200 outputs corresponding first display signals and corresponding first display instructions. The control module 160 can control the first end of the fourth switch circuit 154 to couple to the third end of the fourth switch circuit 154 and the first end of the seventh switch circuit 157 to couple to the third end of the seventh switch circuit 157 according to the corresponding first display instructions. The corresponding first display signal can be transmitted to the second display module 140 for display through a transmission path formed by the first end of the fourth switch circuit 154, the third end of the fourth switch circuit 154, the first end of the seventh switch circuit 157, and the third end of the seventh switch circuit 157.

If a user needs to display a product document simultaneously on the first display module 130 and the second display module 140. The user can select a window of the product document, the first display module 130, and the second display module 140 on the first input device 200, and further select a display mode of the first display module 130 and the second display module 140 as a duplicate display mode. The first input device 200 outputs corresponding first display signals and corresponding first display instructions. The control module 160 can control the first end of the fourth switch circuit 154 to couple to the second end of the fourth switch circuit 154 and the first end of the sixth switch circuit 156 to couple to the third end of the sixth switch circuit 156 according to the corresponding first display instructions. The corresponding first display signals can be transmitted to the first display module 130 through the first end of the fourth switch circuit 154, the second end of the fourth switch circuit 154, the first end of the sixth switch circuit 156, and the third end of the sixth switch circuit 156, and further transmitted to the second display module 140 through the first display module 130. In this way, the corresponding first display signals can be transmitted to the first display module 130 and the second display module 140 for display.

If a user needs the first display module 130 and the second display module 140 to operate as one display module for displaying a product document. The user can select a window of the product document, the first display module 130, and the second display module 140 on the first input device 200, and further select a display mode of the first display module 130 and the second display module 140 as an extended display mode. The first input device 200 outputs corresponding first display signals and corresponding first display instructions. The control module 160 can control the first end of the fourth switch circuit 154 to couple to the second end of the fourth switch circuit 154 and the first end of the sixth switch circuit 156 to couple to the third end of the sixth switch circuit 156 according to the corresponding first display instructions. The corresponding first display signals can be transmitted to the first display module 130 through the fourth switch circuit 154 and the sixth switch circuit 156, and further transmitted to the second display module 140 through the first display module 130. In this way, the corresponding first display signals can be transmitted to the first display module 130 and the second display module 140 for display. The first display signals transmitted to the first display module 130 and the second display module 140 can be the same, or different first display signals can be transmitted to the first display module 130 and the second display module 140 according to a display requirement of a window displayed in each display module.

In one embodiment, when the second interface 120 is coupled to the second input device 300 and a user needs to display a product document on the second display module 140, the user can select a window of the product document and the second display module 140 on the second input device 300. The second input device 300 outputs corresponding second display signals and corresponding second display instructions. The control module 160 can control the first end of the fifth switch circuit 155 to couple to the third end of the fifth switch circuit 155 and the second end of the seventh switch circuit 157 to couple to the third end of the seventh switch circuit 157 according to the corresponding second display instructions. Thus, the corresponding second display signals can be transmitted to the second display module 140 for display.

If a user needs to display a product document on the first display module 130, the user can select a window of the product document and the first display module 130 on the second input device 300. The second input device 200 outputs corresponding second display signals and corresponding second display instructions. The control module 160 can control the first end of the fifth switch circuit 155 to couple to the second end of the fifth switch circuit 155 and the second end of the sixth switch circuit 156 to couple to the third end of the sixth switch circuit 156 according to the corresponding second display instructions. Thus, the corresponding second display signals can be transmitted to the first display module 130 for display.

If a user needs to display a product document simultaneously on the first display module 130 and the second display module 140. The user can select a window of the product document, the first display module 130, and the second display module 140 on the second input device 300, and further select a display mode of the first display module 130 and the second display module 140 as a duplicate display mode. The second input device 300 outputs corresponding second display signals and corresponding second display instructions. The control module 160 can control the first end of the fifth switch circuit 155 to couple to the second end of the fifth switch circuit 155 and the second end of the sixth switch circuit 156 to couple to the third end of the sixth switch circuit 156 according to the corresponding second display instructions. The corresponding second display signals can be transmitted to the first display module 130 through the fifth switch circuit 155 and the sixth switch circuit 156, and further transmitted to the second display module 140 through the first display module 130. In this way, the corresponding second display signals can be simultaneously transmitted to the first display module 130 and the second display module 140 for display.

If a user needs the first display module 130 and the second display module 140 to operate as one display module for displaying a product document. The user can select a window of the product document, the first display module 130, and the second display module 140 on the second input device 300, and further select a display mode of the first display module 130 and the second display module 140 as an extended display mode. The second input device 300 outputs corresponding second display signals and corresponding second display instructions. The control module 160 can control the first end of the fifth switch circuit 155 to couple to the second end of the fifth switch circuit 155 and the second end of the sixth switch circuit 156 to couple to the third end of the sixth switch circuit 156 according to the corresponding second display instructions. The corresponding second display signals can be transmitted to the first display module 130 through the fifth switch circuit 155 and the sixth switch circuit 156, and further transmitted to the second display module 140 through the first display module 130. In this way, the corresponding second display signals can be transmitted to the first display module 130 and the second display module 140 for display. The corresponding second display signals transmitted to the first display module 130 and the second display module 140 can be the same, or different second display signals can be transmitted to the first display module 130 and the second display module 140 according to a display requirement of a window displayed in each display module.

In one embodiment, when the first interface 110 is coupled to the first input device 200, and the second interface 120 is coupled to the second input device 300, a user can select a window to be displayed and one or more display module to be displayed on the first input device 200 and the second input device 300 respectively.

For example, if a user needs to display a product document stored in the first input device 200 on the first display module 130, and display a product image stored in the second input device 300 on the second display module 140. A window of the product document and the first display module 130 can be selected on the first input device 200, the first input device 200 outputs corresponding first display instructions and corresponding first display signals. The control module 160 can control the first end of the fourth switch circuit 154 to couple to the second end of the fourth switch circuit 154 and the first end of the sixth switch circuit 156 to couple to the third end of the sixth switch circuit 156 according to the corresponding first display instructions, then the corresponding first display signals can be transmitted to the first display module 130 for display. In addition, a window of the product image and the second display module 140 can be selected on the second input device 300, the second input device 300 outputs corresponding second display instructions and corresponding second display signals. The control module 160 can control the first end of the fifth switch circuit 155 to couple to the third end of the fifth switch circuit 155 and the second end of the seventh switch circuit 157 to couple to the third end of the seventh switch circuit 157 according to the corresponding second display instructions, then the corresponding second display signals can be transmitted to the second display module 140 for display.

If a user needs to display a product image stored in the second input device 300 on the first display module 130, and display a product document stored in the first input device 200 on the second display module 140. A window of the product document and the second display module 140 can be selected on the first input device 200, the first input device 200 outputs corresponding first display instructions and corresponding first display signals. The control module 160 can control the first end of the fourth switch circuit 154 to couple to the third end of the fourth switch circuit 154 and the first end of the seventh switch circuit 157 to couple to the third end of the seventh switch circuit 157 according to the corresponding first display instructions, then the corresponding first display signals can be transmitted to the second display module 140 for display. In addition, a window of the product image and the first display module 130 can be selected on the second input device 300, and the second input device 300 outputs corresponding second display instructions and corresponding second display signals. The control module 160 can control the first end of the fifth switch circuit 155 to couple to the second end of the fifth switch circuit 155 and the second end of the sixth switch circuit 156 to couple to the third end of the sixth switch circuit 156 according to the corresponding second display instructions, then the corresponding second display signals can be transmitted to the first display module 130 for display.

In one embodiment, the first display module 130 may include a first control circuit 131 and a first display screen 132. The first control circuit 131 is configured to control the first display screen 132 to display the first images according to the first display signals, or control the first display screen 132 to display the second images according to the second display signals. The second display module 140 may include a second control circuit 141 and a second display screen 142, the second control circuit 141 is configured to control the second display screen 142 to display the first images according to the first display signals, or control the second display screen 142 to display the second images according to the second display signals.

In one embodiment, the first control circuit 131 can receive the first display signals or the second display signals and transmit the first display signals or the second display signals to the third switch circuit 153. The first control circuit 131 can further receive the first display signals or the second display signals and transmit the first display signals or the second display signals to the second control circuit 141.

In one embodiment, each of the first control circuit 131 and the second control circuit 141 may include one or more chip selected by a microprocessor, a field-effect programmable logic array (FPGA), a digital signal processors (DSP), and a system-on-chips (SoC), etc. Each of the first display screen 132 and the second display screen 142 may include an organic light-emitting diode (OLED) screen, a liquid crystal display (LCD) screen, or a light-emitting diode (LED) screen, etc.

In one embodiment, the first display screen 132 can be rotatably connected with the second display screen 142, and a rotation angle between the first display screen 132 and the second first display screen 142 can be 60° to 300°.

For example, the first display screen 132 is connected with the second display screen 142 through a pivot or a hinge, then the first display screen 132 can be rotated to a suitable angle with respect to the second display screen 142.

Figure 5:
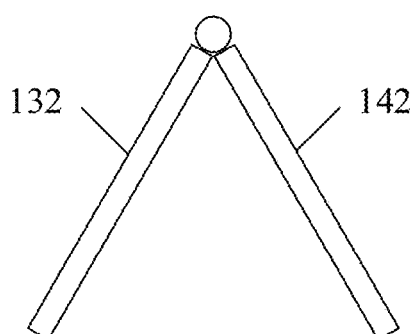
FIG. 5 is a structure diagram illustrating a first display screen and a second display screen according to an embodiment of the present disclosure.

Referring to FIG. 5, when a user need to show screen content in two opposite directions, the user can rotate the first display screen 132 and the second display screen 142 to an angle of 300°. The first display screen 132 displays the product image, and the second display screen 142 displays the product document. Alternatively, the first display screen 132 and the second display screen 142 both display the product image or the first display screen 132 and the second display screen 142 both display the product document.

Figure 6:
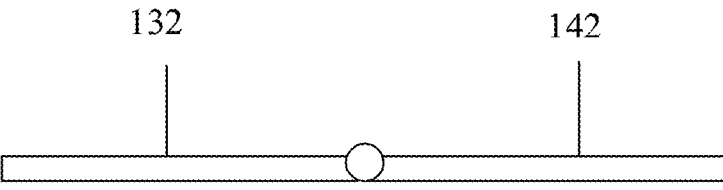
FIG. 6 is a structure diagram illustrating the first display screen and the second display screen according to another embodiment of the present disclosure.

Refer to FIG. 6, when a user need to display a larger screen content, the user can rotate the first display screen 132 and the second display screen 142 to an angle of 180°, the first display screen 132 and the second display screen 142 display the product image or the product document as a whole.

In addition, the angle between the first display screen 132 and the second display screen 142 can also be set to other angles according to an actual application, and there is no restriction here.

In one embodiment, the display device 100 may further include a power circuit 170 coupled to the first interface 110 and the second interface 120. The first interface 110 can be further configured to receive a first power supply voltage, and the power circuit 170 can be configured to transmit the first power supply voltage to the second interface 120.

In one embodiment, the second interface 120 can be further configured to receive a second power supply voltage, and the power circuit 170 can be configured to transmit the second power supply voltage to the first interface 110.

In one embodiment, the first interface 110 and the second interface 120 can also be coupled to a charger. For example, when a power of the first input device 200 connected to the first interface 110 is low, the charger can be connected through the second interface 120, and a power supply voltage output by the charger can be converted into an operation voltage of the first input device 200 for charging through the power circuit 170. Similarly, when a power of the second input device 300 connected to the second interface 120 is low, the charger can be connected through the first interface 110, and a power supply voltage output by the charger can be converted into an operation voltage of the second input device 300 for charging through the power circuit 170. In this way, an endurance of the first input device 200 and the second input device 300 can be improved, a display time of the first display module 130 and the second display module 140 can also be improved, to avoid an interrupting of screen display due to a power failure of the first/second input device in a display process.

Figure 7:
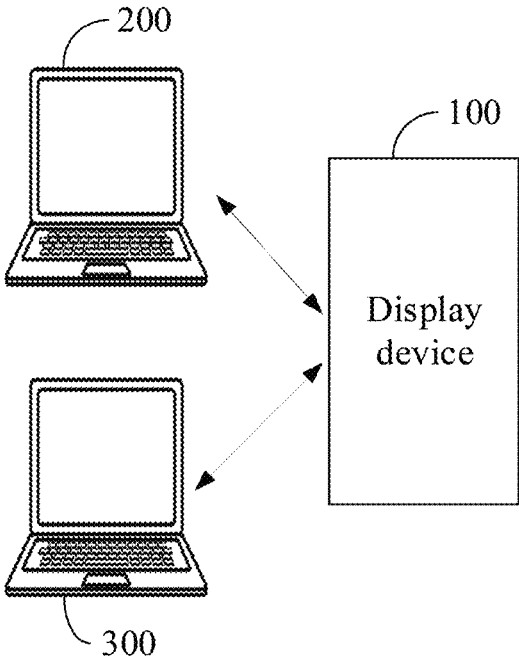
FIG. 7 is a block diagram illustrating a display system according to an embodiment of the present disclosure.

FIG. 7 illustrates an embodiment of a display system 10. The display system 10 may include the first input device 200, the second input device 300, and the display device 100. The first input device 200 can be configured to control the display device 100 to display first images, the second input device 300 can be configured to control the display device 100 to display second images.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A display device comprising:
   a first interface configured to receive first display signals;
   a second interface configured to receive second display signals;
   a first display module configured to display first images according to the first display signals, or display second images according to the second display signals;
   a second display module configured to display the first images according to the first display signals, or display the second images according to the second display signals; and
   a signal transmission module coupled to the first interface, the second interface, the first display module, and the second display module,
   wherein when the signal transmission module receives first display control signals, the signal transmission module transmits the first display signals to the first display module or to the second display module according to the first display control signals;
   when the signal transmission module receives second display control signals, the signal transmission module transmits the second display signals to the first display module or to the second display module according to the second display control signals;
   when the signal transmission module receives third display control signals, the signal transmission module transmits the first display signals to the first display module and to the second display module according to the third display control signals;
   when the signal transmission module receives fourth display control signals, the signal transmission module transmits the second display signals to the first display module and to the second display module according to the fourth display control signals.

2. The display device of claim 1, wherein the signal transmission module comprises a first switch circuit, a second switch circuit, and a third switch circuit; a first end of the first switch circuit is coupled to the first interface, a second end of the first switch circuit is coupled to the first display module, a third end of the first switch circuit is coupled to a first end of the third switch circuit, a fourth end of the first switch circuit receives first control signals, wherein the first control signals are configured to control the first end of the first switch circuit to couple to the second end of the first switch circuit, or control the first end of the first switch circuit to couple to the third end of the first switch circuit;
   a first end of the second switch circuit is coupled to the second interface, a second end of the second switch circuit is coupled to the first display module, a third end of the second switch circuit is coupled to the second display module, a fourth end of the second switch circuit receives second control signals; the second control signals are configured to control the first end of the second switch circuit to couple to the second end of the second switch circuit, or control the first end of the second switch circuit to couple to the third end of the second switch circuit;
   a second end of the third switch circuit is coupled to the first display module, a third end of the third switch circuit is coupled to the second display module, a fourth end of the third switch circuit receives third control signals; the third control signals are configured to control the first end of the third switch circuit to couple to the third end of the third switch circuit, or control the second end of the third switch circuit to couple to the third end of the third switch circuit; and
   the first display module further transmits the first display signals or the second display signals to the third switch circuit.

3. The display device of claim 2, further comprising a control module, wherein the first interface is configured to couple to a first input device, the second interface is configured to couple to a second input device; the control module is coupled to the first interface and the second interface, and configured to receive first display instructions outputted by the first input device and/or to receive second display instructions outputted by the second input device; the control module is further configured to output the first display control signals, the second display control signals, the third display control signals, and the fourth display control signals according to the first display instructions and/or the second display instructions.

4. The display device of claim 3, wherein the control module further controls the first display module and the second display module to operate as one display module to display the first images or to display the second images, according to the first display instructions and/or the second display instructions.

5. The display device of claim 2, wherein when the second end of the third switch circuit and the third end of the third switch circuit are in conduction, the third switch circuit further transmits the first display signals or the second display signals to the second display module.

6. The display device of claim 1, wherein the first display module comprises a first control circuit and a first display screen; the first control circuit controls the first display screen to display the first images according to the first display signals, or controls the first display screen to display the second images according to the second display signals; the second display module comprises a second control circuit and a second display screen; the second control circuit controls the second display screen to display the first images according to the first display signals, or controls the second display screen to display the second images according to the second display signals.

7. The display device of claim 6, wherein the first display screen is rotatably connected with the second display screen, and a rotation angle between the first display screen and the second first display screen is 60° to 300°.

8. The display device of claim 1, wherein the signal transmission module comprises a fourth switch circuit, a fifth switch circuit, a sixth switch circuit, and a seventh switch circuit; a first end of the fourth switch circuit is coupled to the first interface, a second end of the fourth switch circuit is coupled to a first end of the sixth switch circuit, a third end of the fourth switch circuit is coupled to a first end of the seventh switch circuit, a fourth end of the fourth switch circuit receives fourth control signals; the fourth control signals are configured to control the first end of the fourth switch circuit to couple to the second end of the fourth switch circuit, or control the first end of the fourth switch circuit to couple to the third end of the fourth switch circuit;

a first end of the fifth switch circuit is coupled to the second interface, a second end of the fifth switch circuit is coupled to a second end of the sixth switch circuit, a third end of the fifth switch circuit is coupled to a second end of the seventh switch circuit, a fourth end of the fifth switch circuit receives fifth control signals; the fifth control signals are configured to control the first end of the fifth switch circuit to couple to the second end of the fifth switch circuit, or control the first end of the fourth switch circuit to couple to the third end of the fourth switch circuit;

a third end of the sixth switch circuit is coupled to the first display module, a fourth end of the sixth switch circuit receives sixth control signals; the sixth control signals are configured to control the first end of the sixth switch circuit to couple to the third end of the sixth switch circuit, or control the second end of the sixth switch circuit to couple to the third end of the sixth switch circuit; and a third end of the seventh switch circuit is coupled to the second display module, a fourth end of the seventh switch circuit receives seventh control signals; the seventh control signals are configured to control the first end of the seventh switch circuit to couple to the third end of the seventh switch circuit, or control the second end of the seventh switch circuit to couple to the third end of the seventh switch circuit.

9. The display device of claim 1, further comprising a power circuit coupled to the first interface and the second interface; wherein the first interface is further configured to receive a first power supply voltage, and the power circuit transmits the first power supply voltage to the second interface; or the second interface is further configured to receive a second power supply voltage, and the power circuit transmits the second power supply voltage to the first interface.

10. A display system comprising a display device, a first input device, and a second input device, wherein the first input device controls the display device to display first images, the second input device controls the display device to display second images, the display device comprises:

a first interface configured to couple to the first input device and receive first display signals;

a second interface configured to couple to the second input device and receive second display signals;

a first display module configured to display first images according to the first display signals, or display second images according to the second display signals;

a second display module configured to display the first images according to the first display signals, or display the second images according to the second display signals; and a signal transmission module coupled to the first interface, the second interface, the first display module, and the second display module;

when the signal transmission module receives first display control signals, the signal transmission module transmits the first display signals to the first display module or to the second display module according to the first display control signals;

when the signal transmission module receives second display control signals, the signal transmission module transmits the second display signals to the first display module or to the second display module according to the second display control signals;

when the signal transmission module receives third display control signals, the signal transmission module transmits the first display signals to the first display module and to the second display module according to the third display control signals;

when the signal transmission module receives fourth display control signals, the signal transmission module transmits the second display signals to the first display module and to the second display module according to the fourth display control signals.

11. The display system of claim 10, wherein the signal transmission module comprises a first switch circuit, a second switch circuit, and a third switch circuit; a first end of the first switch circuit is coupled to the first interface, a second end of the first switch circuit is coupled to the first display module, a third end of the first switch circuit is coupled to a first end of the third switch circuit, a fourth end of the first switch circuit receives first control signals; the first control signals are configured to control the first end of the first switch circuit to couple to the second end of the first switch circuit, or control the first end of the first switch circuit to couple to the third end of the first switch circuit;

a first end of the second switch circuit is coupled to the second interface, a second end of the second switch circuit is coupled to the first display module, a third end of the second switch circuit is coupled to the second display module, a fourth end of the second switch circuit receives second control signals; the second control signals are configured to control the first end of the second switch circuit to couple to the second end of the second switch circuit, or control the first end of the second switch circuit to couple to the third end of the second switch circuit;

a second end of the third switch circuit is coupled to the first display module, a third end of the third switch circuit is coupled to the second display module, a fourth end of the third switch circuit receives third control signals; the third control signals are configured to control the first end of the third switch circuit to couple to the third end of the third switch circuit, or control the second end of the third switch circuit to couple to the third end of the third switch circuit; and the first display module further transmits the first display signals or the second display signals to the third switch circuit.

12. The display system of claim 11, wherein the display device further comprises a control module coupled to the first interface and the second interface, wherein the control module is configured to receive first display instructions outputted by the first input device and/or to receive second display instructions outputted by the second input device, the control module is further configured to output the first display control signals, the second display control signals, the third display control signals, and the fourth display control signals according to the first display instructions and/or the second display instructions.

13. The display system of claim 12, wherein the control module further controls the first display module and the second display module to operate one display module to display the first images or to display the second images, according to the first display instructions and/or the second display instructions.

14. The display system of claim 11, wherein when the second end of the third switch circuit and the third end of the third switch circuit are in conduction, the third switch circuit transmits the first display signals or the second display signals to the second display module.

15. The display system of claim 10, wherein the first display module comprises a first control circuit and a first display screen; the first control circuit controls the first display screen to display the first images according to the first display signals, or controls the first display screen to display the second images according to the second display signals; the second display module comprises a second control circuit and a second display screen; the second control circuit controls the second display screen to display the first images according to the first display signals, or controls the second display screen to display the second images according to the second display signals.

16. The display system of claim 15, wherein the first display screen is rotatably connected with the second display screen, and a rotation angle between the first display screen and the second first display screen is 60° to 300°.

17. The display system of claim 10, wherein the signal transmission module comprises a fourth switch circuit, a fifth switch circuit, a sixth switch circuit, and a seventh switch circuit; a first end of the fourth switch circuit is coupled to the first interface, a second end of the fourth switch circuit is coupled to a first end of the sixth switch circuit, a third end of the fourth switch circuit is coupled to a first end of the seventh switch circuit, a fourth end of the fourth switch circuit receives fourth control signals; the fourth control signals are configured to control the first end of the fourth switch circuit to couple to the second end of the fourth switch circuit, or control the first end of the fourth switch circuit to couple to the third end of the fourth switch circuit;

a first end of the fifth switch circuit is coupled to the second interface, a second end of the fifth switch circuit is coupled to a second end of the sixth switch circuit, a third end of the fifth switch circuit is coupled to a second end of the seventh switch circuit, a fourth end of the fifth switch circuit receives fifth control signals; the fifth control signals are configured to control the first end of the fifth switch circuit to couple to the second end of the fifth switch circuit, or control the first end of the fourth switch circuit to couple to the third end of the fourth switch circuit;

a third end of the sixth switch circuit is coupled to the first display module, a fourth end of the sixth switch circuit receives sixth control signals; the sixth control signals are configured to control the first end of the sixth switch circuit to couple to the third end of the sixth switch circuit, or control the second end of the sixth switch circuit to couple to the third end of the sixth switch circuit; and a third end of the seventh switch circuit is coupled to the second display module, a fourth end of the seventh switch circuit receives seventh control signals; the seventh control signals are configured to control the first end of the seventh switch circuit to couple to the third end of the seventh switch circuit, or control the second end of the seventh switch circuit to couple to the third end of the seventh switch circuit.

18. The display system of claim 10, wherein the display device further comprises a power circuit coupled to the first interface and the second interface; the first interface is further configured to receive a first power supply voltage, and the power circuit transmits the first power supply voltage to the second interface; or the second interface is further configured to receive a second power supply voltage, and the power circuit transmits the second power supply voltage to the first interface.

* * * * *